United States Patent
Umemoto et al.

(10) Patent No.: US 7,448,192 B2
(45) Date of Patent: Nov. 11, 2008

(54) FILL DETECTION DEVICE FOR GRASS CONTAINER

(75) Inventors: Hideya Umemoto, Sakai (JP); Eriya Harada, Sakai (JP); Hiroki Nagai, Izumiotsu (JP); Hiroyuki Tada, Sakai (JP); Nobuyuki Yamashita, Izumi (JP); Kazutomo Miyaguchi, Sakai (JP)

(73) Assignee: Kubota Corporation, Osaka (JP)

( * ) Notice: Subject to any disclaimer, the term of this patent is extended or adjusted under 35 U.S.C. 154(b) by 464 days.

(21) Appl. No.: 11/220,971

(22) Filed: Sep. 7, 2005

(65) Prior Publication Data
US 2006/0201123 A1    Sep. 14, 2006

(30) Foreign Application Priority Data
Mar. 10, 2005 (JP) ............................. 2005-067208
Mar. 10, 2005 (JP) ............................. 2005-067209

(51) Int. Cl.
*A01D 43/00* (2006.01)
*A01D 43/06* (2006.01)

(52) U.S. Cl. ........................................................ 56/202

(58) Field of Classification Search .............. 56/10.2 R, 56/202, 16.6, 320.2, 194, DIG. 15, 203; 340/612, 340/686; 200/47, 61.2, 61.21; 116/303; 73/290 R
See application file for complete search history.

(56) References Cited

U.S. PATENT DOCUMENTS

| | | | | |
|---|---|---|---|---|
| 3,246,313 A | * | 4/1966 | Weaklend | 340/617 |
| 5,605,033 A | * | 2/1997 | Olmr | 56/10.2 R |
| 5,775,077 A | * | 7/1998 | Olmr | 56/202 |
| 5,832,708 A | * | 11/1998 | Sugden | 56/202 |
| 5,960,613 A | * | 10/1999 | Mixon et al. | 56/10.2 R |
| 6,038,843 A | * | 3/2000 | Sebben et al. | 56/202 |
| 6,272,818 B1 | | 8/2001 | Sebben et al. | |
| 6,622,465 B2 | * | 9/2003 | Jerome et al. | 56/203 |

* cited by examiner

*Primary Examiner*—Árpád Fábián-Kovács
(74) *Attorney, Agent, or Firm*—The Webb Law Firm

(57) ABSTRACT

A fill detection device for a grass container includes:
a detection switch;
a pivot sensor that is fastened inside the grass container, that can actuate the detection switch as a result of contact with cut grass, and whose position can be changed between a raised non-detection position and a lowered detection position, the pivot sensor having:
a first pressure-sensing surface that faces generally upwardly when the pivot sensor is in the non-detection position; and
a second pressure-sensing surface that is linked to the first pressure-sensing surface, and that faces generally substantially rearwardly when the pivot sensor is in the non-detection position.

12 Claims, 9 Drawing Sheets

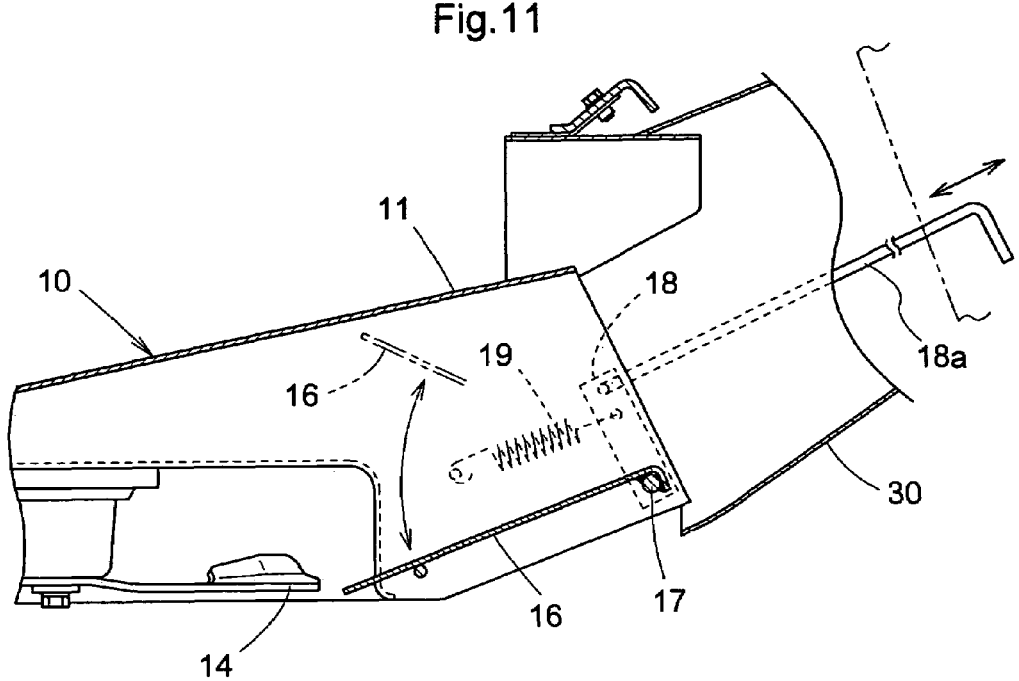

FILL DETECTION DEVICE FOR GRASS CONTAINER

BACKGROUND OF THE INVENTION

The present invention relates to fill detection devices for grass containers of lawn mowers and to grass containers provided with such a device.

When the cut grass that has accumulated in the grass container has reached a preset amount, e.g. when the grass container is fill, then such a fill detection device can detect that the amount of cut grass retained in the grass container has reached the preset amount through a detection operation of a detection means in which a pivot sensor is pivoted downward by the pressure exerted by the cut grass.

As this type of detection sensor, a sensor is known that is provided with a lever 88 (corresponding to a pivot sensor) that is supported by a mounting member 92 pivotably around a rotation axis 108, and an electric switch 96 in which a switch button 100 is actuated via a plate spring 98 by a second portion 102 of the lever 88, as shown in U.S. Pat. No. 6,272,818 (see cols. 7, 8, 9 and FIGS. 4 to 7).

Furthermore, as shown in this document, through the rotation of a swing arm 106 that is operatively fixed to the mounting member 92 around an axis 126, the mounting member 92 rotates together with the swing arm 106 around the axis 126, putting the lever 88 into a posture in which it extends in a relatively straight horizontal direction or into a vertical posture.

That is to say, by changing the angular position of the lever 88, it is possible to adjust the orientation of the pressure-sensing surface of the lever 88 such that the pressure-sensing surface when the lever 88 is in a raised non-detection posture is on the side facing upward or on the side facing sideways.

In this type of fill detection device, the pivot sensor is arranged nearly below the cut grass inlet port of the grass container, such that a detection is made before the cut grass collected in the grass container accumulates near the cut grass inlet port of the grass container and causes jamming of the cut grass inlet port.

As for the cut grass, there is light cut grass that is dry, and there is cut grass that is heavy e.g. because it is wet. In the case of light cut grass, the cut grass that is fed into the grass container falls down while being spread as it comes flying into the grass container, and tends to accumulate at a substantially uniform accumulation height over the entire area of the container. Also, if the pivot sensor receives the pressure exerted by the cut grass from a lateral direction when viewed from the direction of the pivot axis of the pivot sensor, then the efficiency with which the cut grass acts on the pivot sensor in order to pivot the pivot sensor is relatively poor. Therefore, in the case of light cut grass, if the pivot sensor is adapted to receive the pressure exerted by the cut grass from a lateral direction, then already much more cut grass than the preset amount may have accumulated when the pivot sensor pivots downward and the detection means is actuated, and cut grass may easily accumulate up to the cut grass inlet port.

In the case of heavy cut grass, the cut grass that is fed into the container falls down without being spread within the grass container, and tends to accumulate with an accumulation height that is higher at locations further removed from the cut grass inlet port than at locations close to the cut grass inlet port. Moreover, if the pivot sensor is adapted to receive the pressure exerted by the cut grass from a vertical direction with respect to the grass container, then the pivot sensor does not easily pivot downward as long as there is not very much cut grass above the pivot sensor, even when a relatively large amount of cut grass has accumulated in the grass container. Therefore, in the case of heavy cut grass, if the pivot sensor is adapted to receive the pressure exerted by the cut grass from above, then already much more cut grass than the preset amount may have accumulated when the pivot sensor pivots downward and the detection means is actuated, and cut grass may easily accumulate up to the cut grass inlet port.

When employing the above-described conventional detection technology, in the case of light cut grass, it is possible to realize a detection state in which the pivot sensor receives the pressure exerted by the cut grass from above by adjusting the angle of the pivot sensor such that the pressure-sensing surface of the pivot sensor faces upward, and in the case of heavy cut grass, it is possible to realize a detection state in which the pivot sensor receives the pressure exerted by the cut grass from the side by adjusting the angle of the pivot sensor such that the pressure-sensing surface of the pivot sensor faces to the side, but this requires the bothersome task of performing an angular adjustment of the pivot sensor depending on the weight or moisture of the cut grass.

SUMMARY OF THE INVENTION

It is therefore an object of the present invention to provide a fill detection device for a grass container that can perform a suitable detection without requiring the task of an adjustment, regardless of whether the cut grass is light or heavy.

According to one aspect of the present invention, a fill detection device for a grass container includes:
  a detection switch;
  a pivot sensor that is fastened inside the grass container, that can actuate the detection switch as a result of contact with cut grass, and whose position can be changed between a raised non-detection position and a lowered detection position, the pivot sensor having:
    a first pressure-sensing surface that faces generally upwardly when the pivot sensor is in the non-detection position; and
    a second pressure-sensing surface that is linked to the first pressure-sensing surface, and that faces generally substantially rearwardly when the pivot sensor is in the non-detection position.

That is to say, the pressure-sensing portion of the pivot sensor includes a first pressure-sensing surface and a second pressure-sensing surface, so that if the cut grass is light and the cut grass accumulates at a substantially uniform accumulation height across the entire area of the container, a pressure is exerted on the first pressure-sensing of the pivot sensor by the cut grass that has accumulated above the pivot sensor. That is to say, the pivot sensor receives the pressure exerted by the cut grass from above, with respect to the vertical direction of the grass container. Thus, even when the accumulation height of the cut grass above the pivot sensor is low and the weight of the cut grass exerting pressure on the pivot sensor is relatively small, the pivot sensor is efficiently pivoted downward by the cut grass. Hence, a detection state can be realized in which the pivot sensor is pivoted downward and the detection means is actuated, before the actual accumulation amount of the cut grass becomes very different from the set amount, and before the cut grass accumulates to a height at which the cut grass inlet port is positioned.

If the cut grass is heavy, it tends to accumulate with an accumulation height that is higher at locations further removed from the cut grass inlet port than at locations close to the cut grass inlet port, and the cut grass that has accumulated to the side (when viewed from the pivot axis direction of the pivot sensor) exerts a pressure on the second pressure-sensing surface of the pivot sensor, even when cut grass hardly accumulates above the pivot sensor. That is to say, the pivot sensor receives the pressure exerted by the cut grass from the side. Thus, even when there is hardly any cut grass above the pivot sensor, a detection state can be realized in which the pivot sensor is pivoted downward and the detection means is actuated, before the overall amount of the cut grass accumulated in the container becomes very different from the set amount, and before the cut grass accumulates in the vicinity of the cut grass inlet port.

Consequently, with the present invention, it is possible to adjust the pivot sensor such that it receives the pressure of the cut grass from above, and to reduce the necessity for adjusting the pivot sensor such that it receives the pressure of the cut grass from the side.

BRIEF DISRUPTION OF THE DRAWINGS

FIG. 11 is a lateral view of the portion of a grass cutter according to another embodiment that is provided with a cut grass discharge chute.

DETAILED DESCRIPTION OF THE PREFERRED EMBODIMENTS

The following is a detailed description of preferred embodiments of the present invention, with reference to the accompanying drawings.

Figure 1:
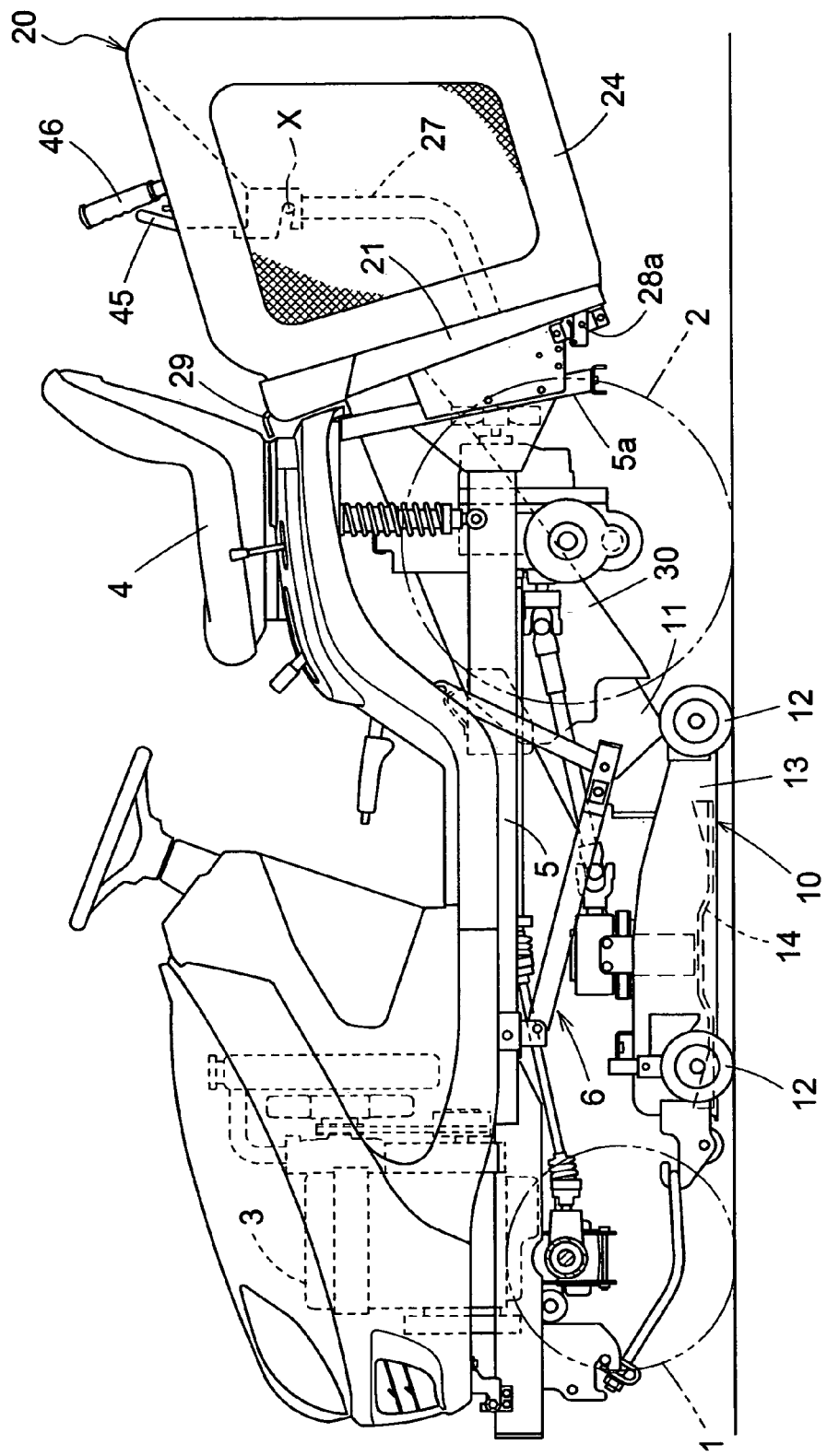
FIG. 1 is an overall lateral view of a riding-type lawn mower.
Figure 2:
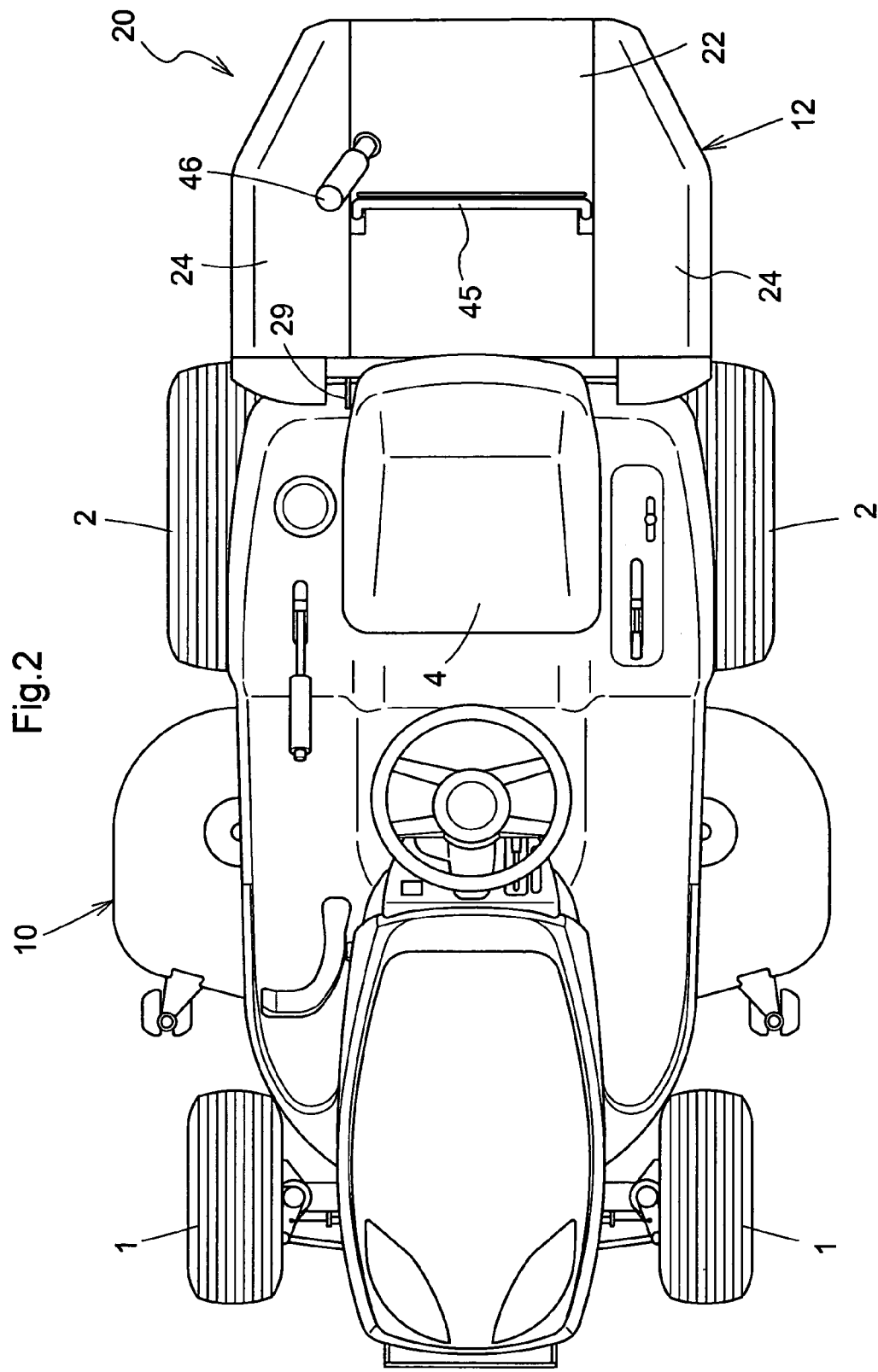
FIG. 2 is an overall top view of a riding-type lawn mower.

As shown in FIGS. 1 and 2, a riding-type lawn mower is provided with a pair of steerable and drivable left and right front wheels 1, a pair of drivable left and right rear wheels 2, and a driving section including a prime mover portion such as an engine 3 that is provided at the front end of the vehicle body and adapted so as to transmit a moving force to the front and rear wheels 1 and 2, and a driver seat 4 that is positioned above the region between the left and right rear wheels 2. A grass cutter 10 is operatively coupled via a linking mechanism 6 to a vehicle frame 5 between the front and rear wheels. Motive power is transmitted from the engine 3 to the grass cutter 10. A grass container 20 is provided behind the rear wheels 2 at the rear end of the automotive vehicle body. A cut grass discharge chute 11 of the grass cutter 10 is linked to the grass container 20 via a duct 30 that is arranged such that it is connected in the longitudinal direction of the automotive vehicle body to the region between the left and right rear wheels 2.

This lawn mower performs the task of cutting lawn or grass. Through the operation of extending and contracting a hydraulic telescopic cylinder (not shown in the drawings) that is operatively linked to the linking mechanism 6, the telescopic cylinder raises and lowers the linking mechanism 6 in a pivoting movement with respect to the vehicle frame 5, thereby lowering the grass cutter 10 to a lowered operating position in which a ground gauge wheel 12 touches the ground and a raised operating position in which the ground gauge wheel 12 is raised from the ground. When the automotive vehicle body moves while the grass cutter 10 is in the lowered operating position, the grass cutter 10 cuts the lawn or grass with rotatively driven cutting blades 14 that are lined up in the transverse direction of the automotive vehicle body inside a cutting blade housing 13. The cut lawn or grass (referred to for simplicity as "cut grass" below) is discharged from the cut grass discharge chute 11 of the cutting blade housing 13 by the draft that is generated when rotating the cutting blades 14, and is carried through the duct 30 and between the left and rear wheels 2 in longitudinal direction of the vehicle body to the grass container 20. The grass container 20 collects and retains the cut grass from the duct 30.

Figure 4:
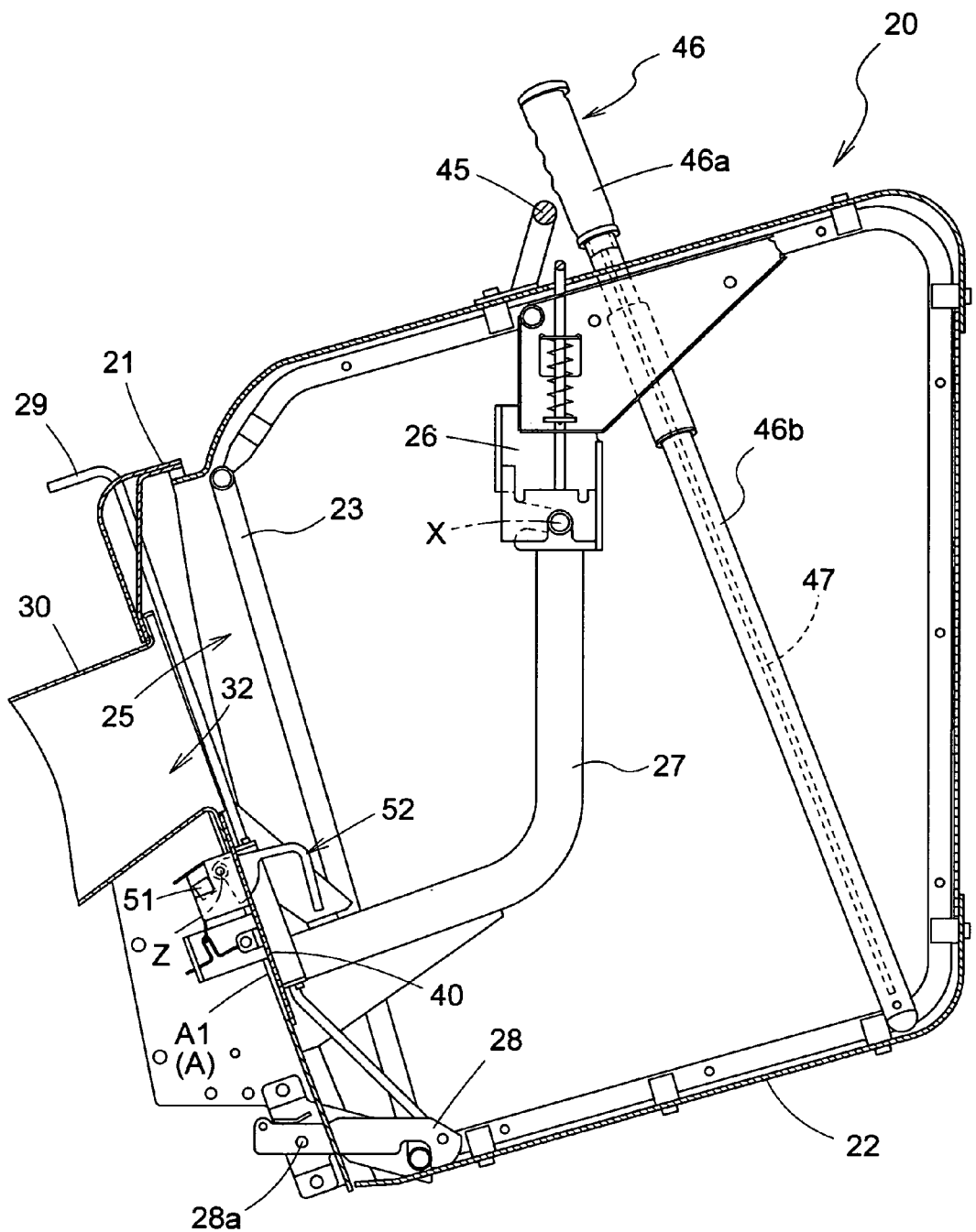
FIG. 4 is a longitudinal cross-sectional view of the grass container.

As shown in FIG. 4, the grass container 20 includes a wall member 21 shaped as a vertical plate extending along the vehicle body's vertical direction when viewed from the side of the vehicle body, and a main container member 22 that is arranged behind this wall member 21. The wall member 21 is rectangular when viewed from the front or the rear of the vehicle body, and is supported at the rear end of the vehicle frame 5 through a support frame 5a that extends from the vehicle frame 5 to the rear.

The main container member 22 has a box shape that is given by a container frame 23 made of round pipe members, a pair of left and right wall covers 24 linked to this container frame 23, a bottom plate, a top plate and a rear wall plate. An aperture 25 formed by the container frame 23 is provided on the front end side of the main container member 22.

Figure 3:
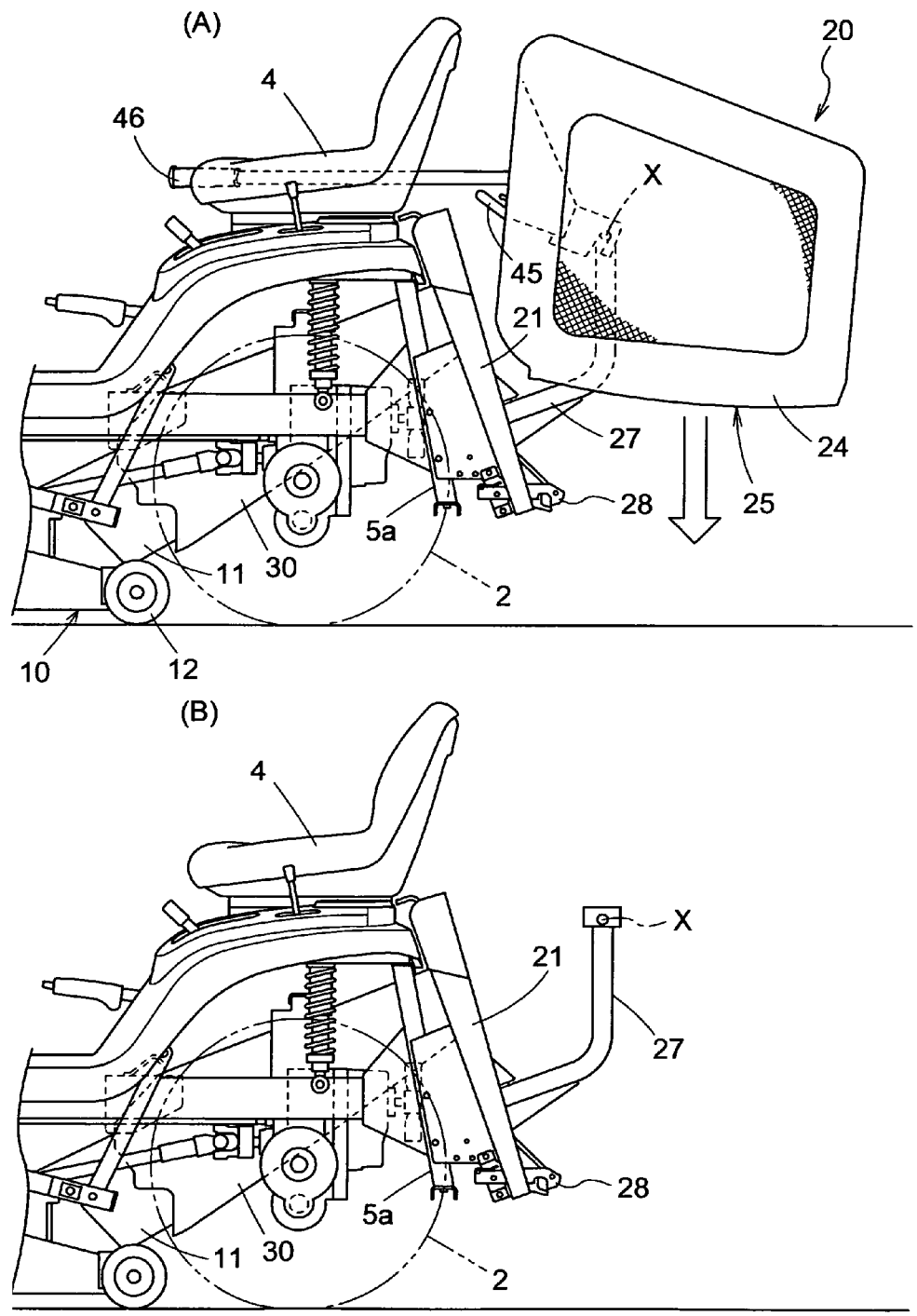
FIG. 3(A) is a lateral view showing how cut grass is discharged from the grass container.
FIG. 3(B) is a lateral view showing a state in which the main container member is removed from the rear portion of the automotive vehicle body.

A pair of left and right supporting arms 27 extend in rearward direction from the wall member 21 into the inside of the main container member 22. A pair of left and right mounting brackets 26 provided inside the main container member 22 is linked rotatively to the end of the left and right supporting arms 27 such that the mounting brackets 26 can be individually attached or removed. The main container member 22 is supported by the wall member 21 such that it can be opened and closed vertically in a pivoting motion with respect to the wall member 21 around an axis X extending in lateral direction of the vehicle body positioned at the front ends of the supporting arms 27, as shown in FIG. 3(A), and such that it can be lodged and dislodged with the mounting brackets 26 and the supporting arms 27, as shown in FIG. 3(B).

Figure 5:
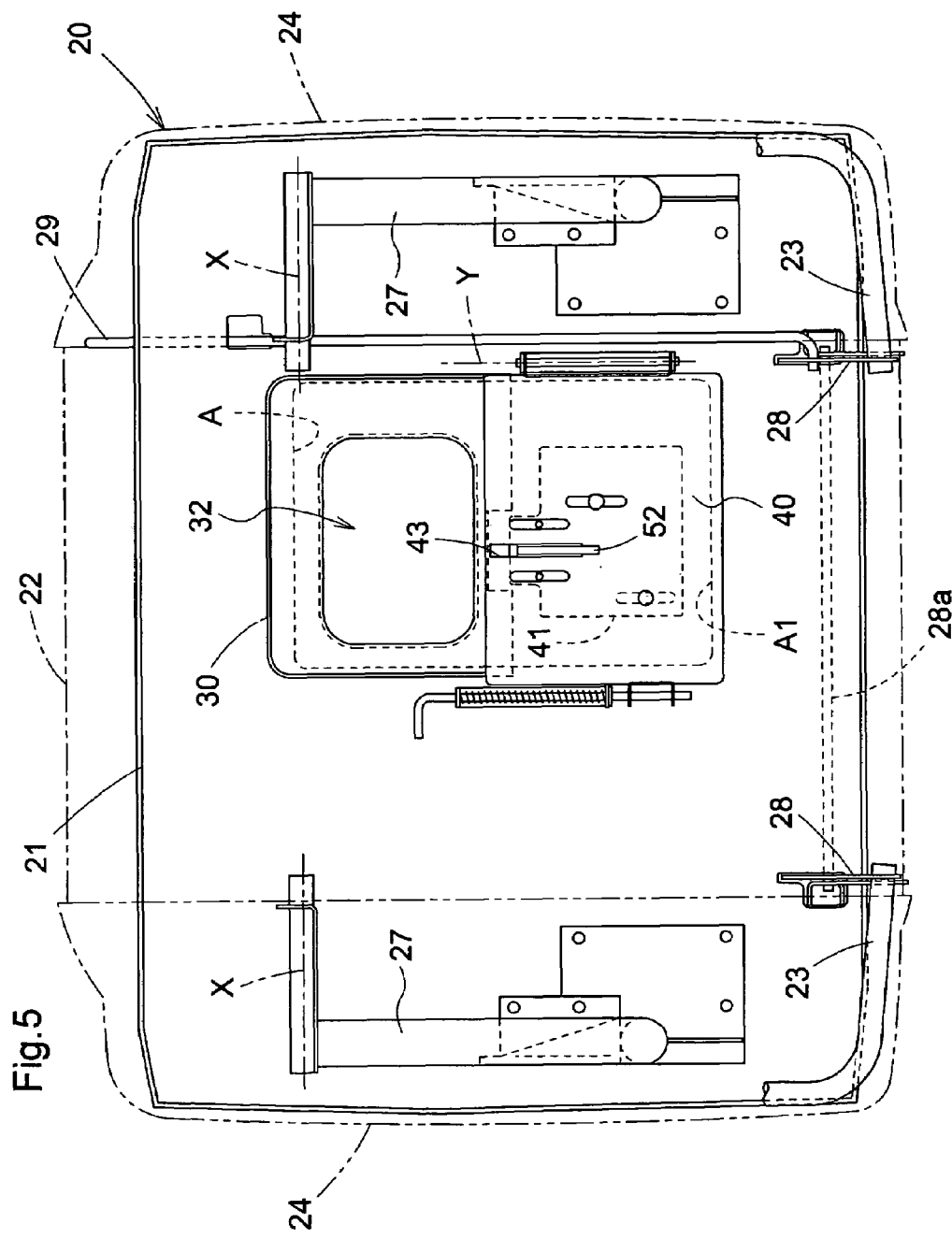
FIG. 5 is a rear view of the wall member of the grass container.

As shown in FIGS. 4 and 5, the rear end of the duct 30 is positioned at a duct hole A of the wall member 21, and the opening on the rear end side of the duct 30 forms a cut grass inlet port 32 of the grass container 20.

That is to say, when performing a grass cutting operation, the main container member 22 is pivoted downward around the axis X with a handle 45 that is fastened to the top plate of the main container member 22 of the grass container 20 and a handle 46 protruding upward from the top plate of the main container member 22, into a position in which the aperture 25 of the main container member 22 points in frontward direction and is shut by the wall member 21, and the grass container 20 is in a shut position for collecting grass. When the grass container 20 is in a shut position for collecting grass, shutter hooks 28 (see FIG. 4) arranged such that they are vertically pivotable at the left and right ends on the lower side of the wall member 21 interlock with the container frame 23, so that the grass container 20 is locked in the shut position for collecting grass, and the task of cutting grass is carried out in this position. In this situation, the cut grass is carried from the cut grass discharge chute 11 of the grass cutter 10 at the front end of the duct 30 rearward due to the draft from the grass cutter 10. At the rear end of the duct 30, the cut grass is fed from the grass inlet port 32 into the grass container 20, where the cut grass is collected and retained by the wall member 21 and the main container member 22, while the draft that has entered the grass container 20 from the duct 30 together with the cut grass is evacuated out of the grass container through evacuation holes provided in the lateral side covers 24.

When the grass container 20 is full, an operation rod 29 (see FIG. 4) operatively linked to one of the pair of left and right shutter hooks 28 is lifted, thus switching the shutter hook 28 to which the operation rod 29 is linked to an unlocked position in which it is dislodged from the container frame 23. Since the two left and right shutter hooks 28 are operatively linked by a rotation shaft 28a, also the other shutter hook 28 is switched to the unlocked state, so that the grass container 20 which has been locked shut by the shutter hooks 28 is released, and through operating the handles 45 and 46, the main container member 22 is pivoted upward around the axis X, and the aperture 25 of the main container member 22 is removed to the rear from the wall member 21, to a raised and open state in which the aperture 25 is open in downward direction. Thus, the grass container 20 is put into an open discharge state, in which the cut grass retained in the grass container can be discharged by letting it fall down from the aperture 25 of the main container member 22.

Figure 7:
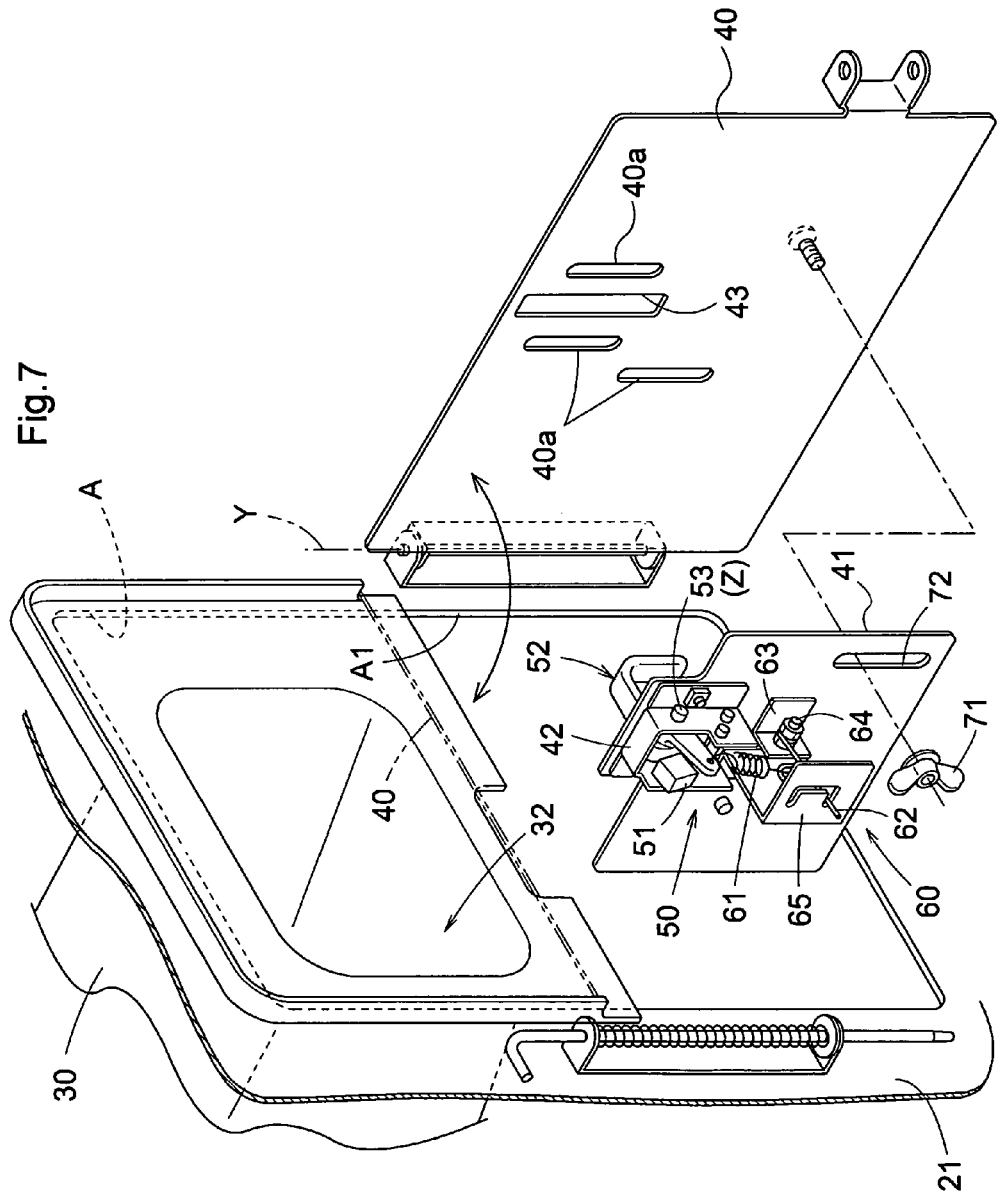
FIG. 7 is an oblique view of the fill detection device.

As shown in FIGS. 5 and 7 for example, a lid 40 made of sheet metal for a portion A1 of the duct hole A of the wall member 21 that is positioned below the duct 30 in the vertical direction of the grass container is provided to the side on the rear (with respect to the vehicle body) of the wall member 21, that is, to the side inside the grass container. The lid 40 is configured such that it can be shut and closed by pivoting it around an axis Y extending in vertical direction of the grass container and positioned on one side in lateral direction of the grass container. This lid 40 is provided with a fill detection device 50 provided with a pivot sensor 52 and a detection switch 51.

When the cut grass collected in the grass container 20 reaches a preset amount, such as when the grass container 20 is full, the fill detection device 50 detects this and the detection switch 51 outputs the detection result, activating an alarm (not shown in the drawings) at the driver section. This is explained in detail in the following.

Figure 6:
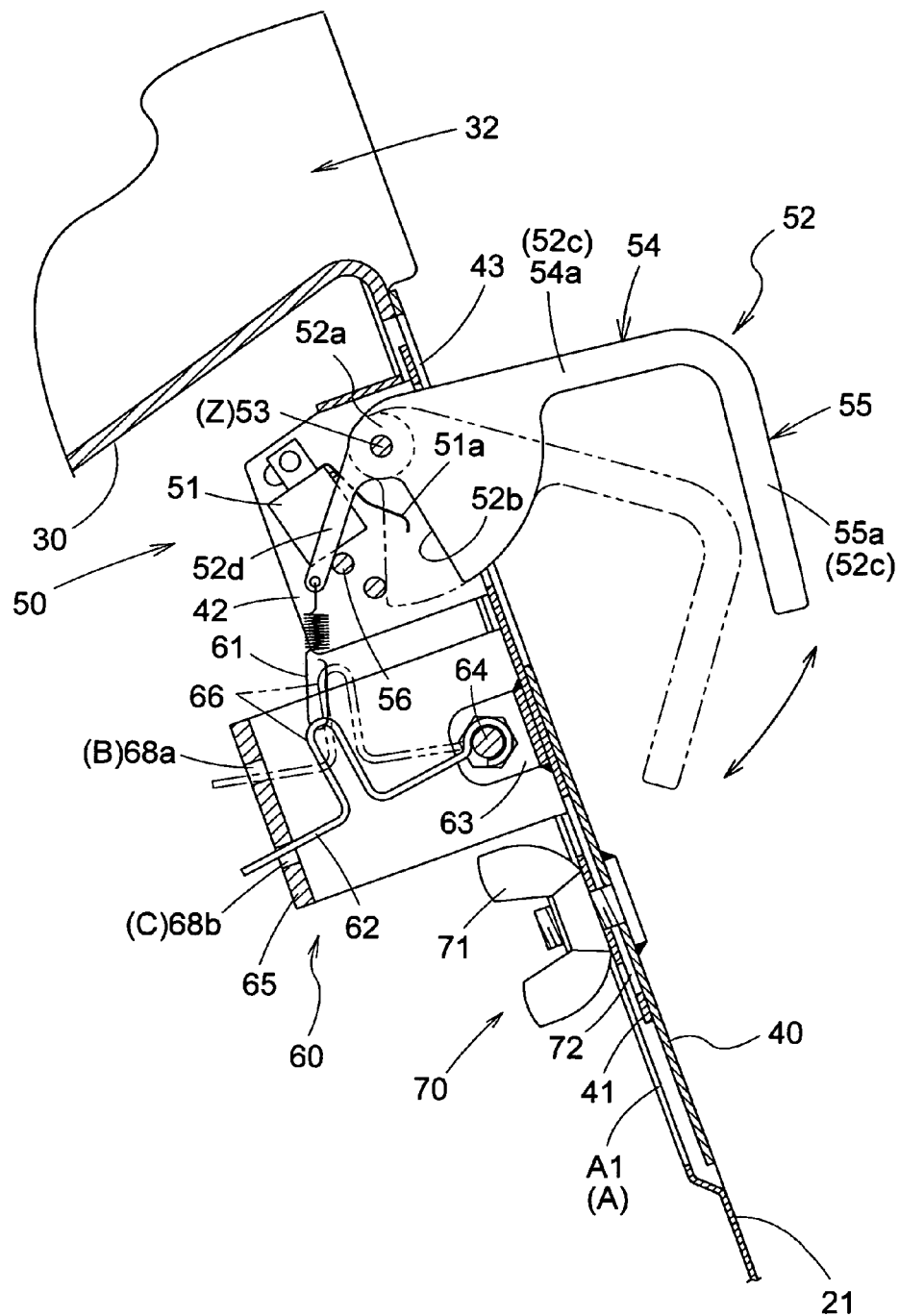
FIG. 6 is a lateral view of a fill detection device.

As shown in FIGS. 6 and 7, the fill detection device 50 includes the pivot sensor 52, the detection switch 51 and a coil-shaped spring 61. The pivot sensor is rotatively linked at a mounting base portion 52a via a support shaft 53 to a support plate portion 42 of a detector mounting member 41 supported on the rear side of the lid 40. The detection switch 51 is supported by the support plate portion 42. The coil-shaped spring 61 is operatively linked to a spring support arm 52d extending from the mounting base portion 52a of the pivot sensor 52.

The pivot sensor 52 is provided with a pressure-sensing portion 52c extending from the mounting base portion 52a through a sensor hole 43 in the lid 40 into the grass container 20. The pressure-sensing portion 52c is positioned nearly below the cut grass inlet port 32 and has a first pressure-sensing surface 54 and a second pressure-sensing surface 55. The pivot sensor 52 is a plastic sensor, in which the mounting base portion 52a, a switch actuating portion 52b, the pressure-sensing portion 52c and the spring support arm 52d have been formed into one component from a resinous raw material. The pressure-sensing portion 52c of the pivot sensor 52 is made in such a manner that, when viewed in the direction in which the axis Z of the support shaft 53 extends, the first pressure-sensing surface 54 and the second pressure-sensing surface 55 are arranged perpendicularly or substantially perpendicularly to one another, and the rod-shaped member 54a of the first pressure-sensing surface 54 and the rod-shaped member 55a of the second pressure-sensing surface 55 are linked in a perpendicular arrangement.

That is to say, the pivot sensor 52 is supported in such a state that the pressure-sensing portion 52c pivots vertically around the axis Z of the support shaft 53, which extends laterally in the grass container, inside the grass container 20. When the cut grass inside the grass container 20 does not exert pressure on the pressure-sensing portion 52c of the pivot sensor 52, then the pivot sensor 52 is in a raised non-detecting posture, in which, due to the combined effect of the spring force and/or the weight of the spring 61 and the weight of the pivot sensor 52, the spring support arms 52d of the pivot sensor 52 abut against a stopper 56. When the pivot sensor 52 is in the raised non-detecting posture, the first pressure-sensing surface 54 of the pivot sensor 52 becomes an upward-facing surface with respect to the vertical direction of the grass container, and the second pressure-sensing surface 55 of the pivot sensor 52 becomes a lateral surface with respect to the rear direction of the vehicle body when viewed in the direction in which the sensor pivot axis Z extends. In this state, the switch actuating portion 52b of the pivot sensor 52 is removed from an actuating portion 51a of the detection switch 51, and the detection switch 51 is in the off position. When the cut grass inside the grass container 20 exerts pressure on the pressure-sensing portion 52c of the pivot sensor 52, then the pressure-sensing portion 52c of the pivot sensor 52 pivots downward due to this pressure, and the switch actuating portion 52b tilts forward around the axis Z. Then, when the pressure due to the cut grass reaches the preset pressure, the pivot sensor 52 assumes a lowered detection posture, in which the switch operation portion 52b abuts against the actuating portion 51a of the detection switch 51. When the pivot sensor 52 has assumed the lowered detection posture, the detection switch 51 is switched on by the switch actuating portion 52b.

As shown in FIG. 6, a sensitivity adjusting means 60 for adjusting the sensitivity of the pivot sensor 52 is provided, including the spring 61 which is operatively linked to the pivot sensor 52, and a sensitivity adjusting member 62 also serving as a spring support rod, whose one end is linked to the side opposite the side where the spring 61 is linked to the pivot sensor 52.

Figure 8:
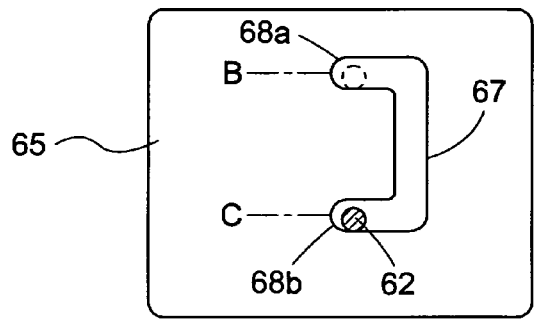
FIG. 8 is a front view of an adjustment guide member.

As shown in FIGS. 6 and 7, the base end side of the sensitivity adjusting member 62 is supported rotatively by a support shaft 64 made of a bolt that is mounted to the fixed bracket 63 that is fixed with respect to the detector mounting member 41. The front end side of the sensitivity adjusting member 62 is supported by an adjustment guide member 65 that is fixed with respect to the detector mounting member 41. Raising and lowering an operating portion 66 that also serves as a spring latch provided in the middle of the sensitivity adjusting member 62, the front end of the sensitivity adjusting member 62 can be raised or lowered along a guide groove 67 in vertical direction (with respect to the grass container) of the adjusting guide member 65, with the sensitivity adjustment member 62 pivoting around the support shaft 64, as shown in FIG. 8. When the sensitivity adjusting member 62 is raised to the upper side of the guide groove 67, and held in position by being placed in the positioning groove portion 68*a* of the adjusting guide member 65 connected to the guide groove 67, then the sensitivity adjusting member 62 is held while being placed in a high-sensitivity position B, and the spring 61 is loosened so much that it is in a free state while the pivot sensor 52 is in the raised non-detecting position. When the sensitivity adjusting member 62 is lowered to the lower side of the guide groove 67, and held in position by being placed in the positioning groove portion 68*b* of the adjusting guide member 65 connected to the guide groove 67, then the sensitivity adjusting member 62 is held while being placed in a low-sensitivity position C, and the spring 61 is tightened so that the spring 61 is elastically deformed, as the pivot sensor 52 is lowered from the raised non-detecting position.

Thus, when the sensitivity adjusting member 62 is placed in the high-sensitivity position B, the sensitivity adjusting means 60 adjusts the sensitivity with respect to the pressure exerted on the pivot sensor 52 by the cut grass to a high sensitivity, so that the spring 61 is substantially not deformed elastically even when the pivot sensor 52 pivots down, there is hardly any resistance by the spring 61 against a downward pivoting of the spring sensor 52, and the pivot sensor 52 reacts to a comparatively light pressure of cut grass. On the other hand, when the sensitivity adjusting member 62 is placed in the low-sensitivity position C, the sensitivity adjusting means 60 adjusts the sensitivity with respect to the pressure exerted on the pivot sensor 52 by the cut grass to a low sensitivity, so that the spring 61 is elastically deformed as the pivot sensor 52 pivots down, there is resistance by the spring 61 against a downward pivoting of the spring sensor 52, and the pivot sensor 52 does not react to a comparatively light pressure.

As shown in FIG. 7, a setting height adjustment means 70 for adjusting the setting height of the pivot sensor 52 is configured by a coupling screw 71 for tightening the detector supporting member 41 to the lid 40, and a bolt hole 72 provided in the detector supporting member 41 such that the coupling screw 71 can be screwed into it.

That is to say, the bolt hole 72 is a elongate hole extending in the vertical direction of the grass container 20. The detector mounting member 41 can be raised and lowered with respect to the lid 40 along the bolt hole 72 and the elongate hole-shaped screw holes 40*a* of the lid 40, thus raising and lowering the pivot sensor 52 with respect to the lid 40 along the elongate hole-shaped sensor hole 43 of the lid 40. By raising and lowering the pivot sensor 52 together with the detection switch 51 and the sensitivity adjustment means 60 with respect to the lid 40, the setting height adjustment means 70 changes the vertical position of the pivot sensor 52 with respect to the grass collector 20 and also changes the position of the detection switch 51 and the sensitivity adjustment means 60 together with the pivot sensor 52.

Figure 9:
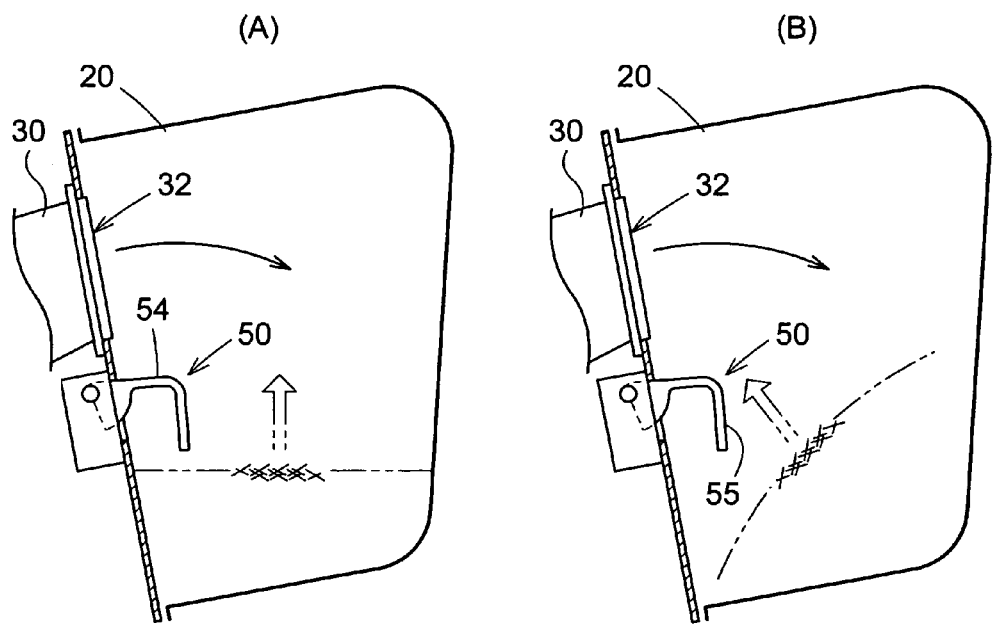
FIG. 9(A) is a diagram illustrating how light cut grass accumulates.
FIG. 9(B) is a diagram illustrating how heavy cut grass accumulates.

Thus, the fill detection device 50 operates as follows:

When the cut grass is light, for example because it is dry, then the cut grass that is fed into the grass container 20 falls down while being spread as it comes flying into the grass container, and tends to accumulate at a substantially uniform accumulation height over the entire area of the container, as shown in FIG. 9(A). In this case, the cut grass that accumulates above the pivot sensor 52 exerts a pressure on the first pressure-sensing surface 54 of the pivot sensor 52. That is to say, the pivot sensor 52 receives the pressure exerted by the cut grass from above the pivot sensor 52, with respect to the grass container. Thus, even when the accumulation height of the grass above the pivot sensor 52 is low and the weight of the cut grass exerting pressure on the pivot sensor 52 is comparatively low, the pivot sensor 52 is pivoted down efficiently by the cut grass, given the weight of that cut grass. Therefore, as the cut grass accumulates in the grass container 20, before the accumulation amount of the cut grass becomes very different from the set amount that depends on the height at which the pivot sensor 52 is arranged, and before the cut grass accumulates near the cut grass inlet port 32, the detection switch 51 is turned on by lowering the pivot sensor 52 to the lowered detection posture, and the detection switch 51 detects the pivoting of the pivot sensor 52 to the lowered detection posture. Thus, the detection switch 51 detects when the amount of retained cut grass has reached the set amount, and outputs this detection result as an electrical signal.

On the other hand, if the cut grass is heavy, for example because it is wet, then the cut grass that is fed into the grass container 20 falls down without being spread in the grass container, and tends to accumulate with an accumulation height that is higher at locations further removed from the cut grass inlet port 32 than at locations close to the cut grass inlet port 32, as shown in FIG. 9(B). In this case, even with hardly any cut grass accumulating above the pivot sensor 52, the cut grass accumulating to the side of the pivot sensor 52 when viewed in the sensor pivot axis direction exerts a pressure on the second pressure-sensing surface 55 of the pivot sensor 52. That is to say, the pivot sensor 52 receives the pressure exerted by the cut grass from the side of the sensor. Thus, as the cut grass accumulates in the grass container 20, before the accumulation amount of the cut grass becomes very different from the set amount that depends on the height at which the pivot sensor 52 is arranged, and before the cut grass accumulates near the cut grass inlet port 32, the detection switch 51 is turned on by lowering the pivot sensor 52 to the lowered detection posture, and the detection switch 51 detects the pivoting of the pivot sensor 52 to the lowered detection posture. Thus, the detection switch 51 detects when the amount of retained grass has reached the set amount, and outputs this detection result as an electrical signal.

Also, in the case of light cut grass, as well as in the case of heavy cut grass that is long and accumulates in a state of reduced density, the pressure exerted on the pivot sensor 52 is light for the accumulated amount, the pivot sensor 52 can be adjusted with the setting height adjustment means 70 to the lower side with respect to the grass container 20, whereas in the case of heavy cut grass, the pivot sensor 52 can be adjusted with the setting height adjustment means 70 to the upper side with respect to the grass container 20. Thus, the detection switch 51 can be adjusted such that the accumulation height of the cut grass during detection operation is the same or substantially the same for light cut grass and for heavy cut grass. Furthermore, even when there is no change in the weight of the cut grass, by adjusting the height of the pivot sensor 52 with respect to the grass container 20 with the setting height adjustment means 70, it is possible to adjust the detection switch 51 such that the accumulation height of the cut grass during the detection operation is lower than before the adjustment operation, or to adjust the detection switch 51 such that the accumulation height of the cut grass during the detection operation is higher than before the adjustment operation.

Furthermore, for example in the case of light cut grass as well as in the case of heavy cut grass that is long and accumulates in a state of reduced density, so that the pressure exerted by the cut grass on the pivot sensor 52 is light for the accumulated amount, the pressure exerted by the cut grass on the pivot sensor 52 is lower and the pivot sensor 52 is less easily pivoted downward than in the case of heavy cut grass, even if a large amount of cut grass has accumulated. Conversely, in the case of heavy cut grass, the pressure exerted by the cut grass on the pivot sensor 52 is higher and the pivot sensor 52 is more easily pivoted downward than in the case of light cut grass, even if only a small amount of cut grass is accumulated. Therefore, in the case of light cut grass, the sensitivity with respect to the pressure exerted by the cut grass on the pivot sensor 52 is set to a high sensitivity with the sensitivity adjustment means 60, thus allowing an adjustment where, if the retention amount of cut grass reaches the set amount or substantially the set amount, the pivot sensor 52 is sufficiently pivoted downward by the pressure exerted on it by the cut grass, and the detection switch is actuated. And in the case of heavy cut grass, the sensitivity with respect to the pressure exerted by the cut grass on the pivot sensor 52 is set to a low sensitivity with the sensitivity adjustment means 60, thus allowing an adjustment where, if the retention amount of cut grass does not reach the set amount or substantially the set amount, the pivot sensor 52 is not sufficiently pivoted downward even when pressure is exerted on it by the cut grass, and the detection switch 51 is not actuated.

Figure 10:
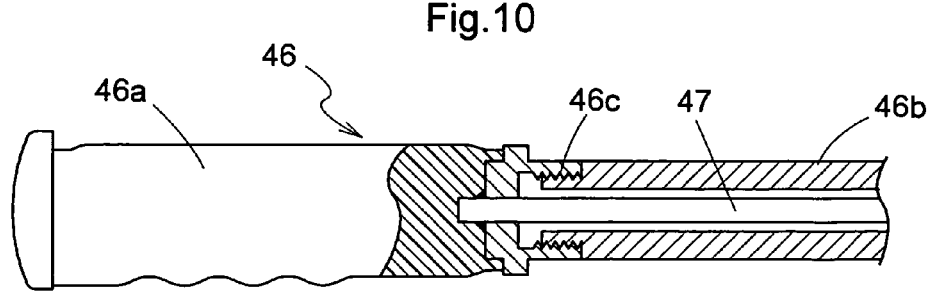
FIG. 10 is a sectional view showing how a cleaning rod is stowed away.

As shown in FIGS. 4 and 10, a grip portion 46a of the handle 46 is linked in a removable fashion with a threaded portion 46c to a tubular member 46b of the handle 46 that is fixed inside the main container member 22. The grip portion 46a is furthermore linked to a cleaning rod 47 that can be inserted into the tubular member 46b.

During operation, this cleaning rod 47 can be stowed away within the tubular member 46b of the handle 46, so that it will not be displaced or forgotten, and when the need arises to clean the cut grass adhering to the inside of the grass container 20, the cleaning rod 47 can be removed from the tubular member 46b of the handle 46a for use.

FIG. 11 shows a grass cutter 10 of a lawn mower according to another embodiment. In this grass cutter 10, a guide bottom plate 16 arranged in the cut grass discharge chute 11 of the cutting blade housing 13 in such a manner that it guides the cut grass to the duct 30 is supported vertically pivotably on the cutting blade housing 13 by a rotation support shaft 17 positioned at the rear end side of the guide bottom plate 16. The guide bottom plate 16 is biased toward a lowered guide posture by a return spring 19 that is operatively coupled to an operation arm 18 linked to one end of the rotation support shaft 17 such that the operation arm 18 and the rotation support shaft 17 can be rotated together.

When cut grass has jammed or adhered in the cut grass discharge chute 11 of the cutting blade housing 13, the main container member 22 of the grass container 20 is removed, the duct 30 is removed, and the guide bottom plate 16 can be pivoted up and down around the axis of the rotation support shaft 17 by moving an operation rod 18a extending in the vehicle body's rearward direction from the operation arm 18 back and forth. Thus, the guide bottom plate 16 serves as a cleaning means, and jammed or adhering cut grass can be cleaned by discharging it from the cut grass discharge chute 11 in rearward direction.

Other Embodiments

Instead of a detection switch 51, it is also possible to attain the object of the present invention by configuring the fill detection device 50 with a potentiometer or the like. The detection switch 51 and the potentiometer or the like are collectively referred to as "detection means 51."

What is claimed is:

1. A fill detection device for a grass container, comprising:
a detection switch;
a pivot sensor that is fastened inside the grass container, that can actuate the detection switch as a result of contact with cut grass, and whose position can be changed between a raised non-detection position and a lowered detection position, the pivot sensor having:
a first pressure-sensing surface that faces generally upwardly when the pivot sensor is in the non-detection position; and
a second pressure-sensing surface that is linked to the first pressure-sensing surface, and that faces generally substantially rearwardly when the pivot sensor is in the non-detection position, wherein
the pivot sensor is fastened to a mounting portion that can be fastened to the grass container, the pivot sensor including a biasing spring and a support arm that is linked to the first pressure-sensing surface, one end of the biasing spring biasing the pivot sensor to the non-detection position by being coupled to the support arm, and the other end of the biasing spring being coupled to an adjusting member whose position can be changed in a vertical direction.

2. The fill detection device according to claim 1, further comprising a set height adjustment means for changing a vertical position of the pivot sensor with respect to the grass container.

3. The fill detection device according to claim 1, wherein the pivot sensor is fastened to a mounting portion that can be moved with respect to the grass container, the mounting portion is provided with a elongate hole and can be fastened with a bolt and a nut via the elongate hole to the grass container, so that the position of the pivot sensor can be adjusted in the direction along which the elongate hole extends.

4. The fill detection device according to claim 3, wherein the elongate hole extends substantially in a vertical direction.

5. The fill detection device according to claim 1, further comprising a sensitivity adjustment means for changing the sensitivity of the pivot sensor.

6. The fill detection device according to claim 1, wherein the adjusting member can pivot about an axis extending in lateral direction.

7. The fill detection device according to claim 1, wherein the first pressure-sensing surface is formed on a first substantially straight rod-shaped member, and the second pressure-sensing surface is formed on a second substantially straight rod-shaped member, extending in a different direction than the first rod-shaped member.

8. The fill detection device according to claim 1, wherein the second pressure-sensing surface extends substantially perpendicularly to said first pressure-sensing surface.

9. The fill detection device according to claim 1, wherein the first pressure-sensing surface is substantially parallel to a bottom surface of the grass container when the pivot sensor is in the non-detection position.

10. The fill detection device according to claim 1, wherein the pivot sensor is fastened to a front wall of the grass container.

11. A grass container comprising:
a front wall portion;
a main container member supported pivotably by the front wall portion;
a detection switch;
a pivot sensor that is fastened inside the grass container, that can actuate the detection switch as a result of contact with cut grass, and whose position can be changed between a raised non-detection position and a lowered detection position, the pivot sensor having:

a first pressure-sensing surface that faces generally upwardly when the pivot sensor is in the non-detection position; and a second pressure-sensing surface that is linked to the first pressure-sensing surface, and that faces generally substantially rearwardly when the pivot sensor is in the non-detection position, wherein the pivot sensor is fastened to a mounting portion that can be fastened to the grass container, the pivot sensor including a biasing spring and a support arm that is linked to the first pressure-sensing surface, one end of the biasing spring biasing the pivot sensor to the non-detection position by being coupled to the support arm, and the other end of the biasing spring being coupled to an adjusting member whose position can be changed in a vertical direction.

12. A grass container comprising:

a front wall portion;

a main container member supported pivotably by the front wall portion;

a detection switch;

a pivot sensor that is fastened to the front wall portion, that can actuate the detection switch as a result of contact with cut grass, and whose position can be changed between a raised non-detection position and a lowered detection position, the pivot sensor having:

a first pressure-sensing surface that faces generally upwardly when the pivot sensor is in the non-detection position; and a second pressure-sensing surface that is linked to the first pressure-sensing surface, and that faces generally substantially rearwardly when the pivot sensor is in the non-detection position, wherein the pivot sensor is fastened to a mounting portion that can be fastened to the grass container, the pivot sensor including a biasing spring and a support arm that is linked to the first pressure-sensing surface, one end of the biasing spring biasing the pivot sensor to the non-detection position by being coupled to the support arm, and the other end of the biasing spring being coupled to an adjusting member whose position can be changed in a vertical direction.

* * * * *